May 31, 1960 F. D. WALDHAUER 2,938,963

SIGNAL AMPLIFIER CIRCUITS

Filed April 5, 1956

INVENTOR.
Frederick D. Waldhauer
BY
H. O. Heuston
ATTORNEY.

United States Patent Office 2,938,963

Patented May 31, 1960

2,938,963

SIGNAL AMPLIFIER CIRCUITS

Frederick D. Waldhauer, Summit, N.J., assignor to Radio Corporation of America, a corporation of Delaware Filed Apr. 5, 1956, Ser. No. 576,290

8 Claims. (Cl. 179—100.2)

Figure 1:
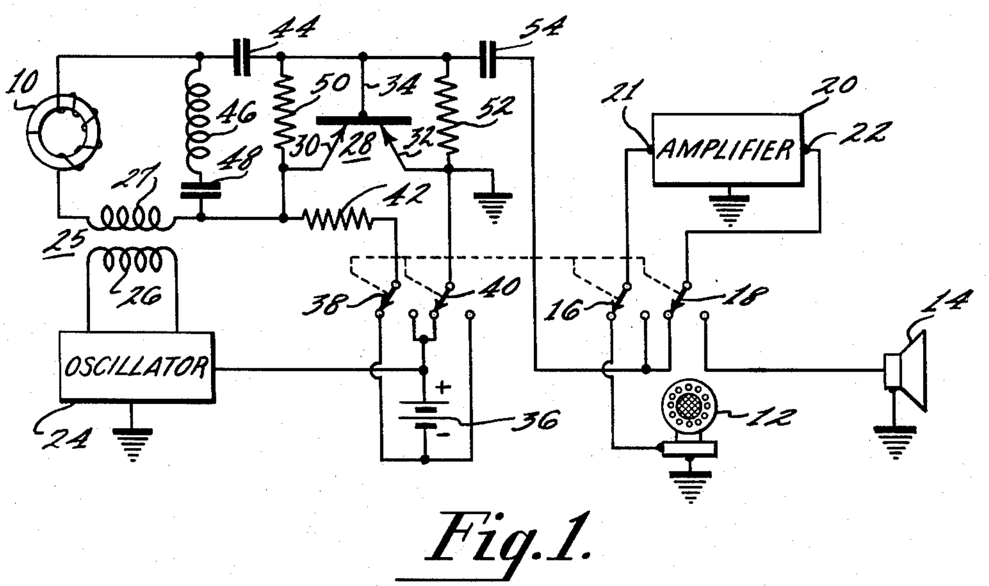

This invention relates to signal amplifier circuits and in particular to transistor signal amplifier circuits capable of signal translation and amplification in two directions for use in magnetic tape recording-playback systems and the like.

For some electronic circuit applications, a single device is used as a means for both recording and detecting signal information. One notable example of a system employing such a device is the magnetic tape recorder in which the magnetic tape head is of the record-playback type. That is to say, the magnetic tape head may (1) be connected to the recording circuit for recording received signals on a magnetic tape, and (2) be connected to a playback amplifier for detecting and amplifying, i.e., playing back signal information which has previously been recorded on the magnetic tape.

One disadvantage of magnetic tape recording systems employing a magnetic tape head which performs the dual function of recording and playing back is that the signal level from the head on playback may be very low. The playback circuit is, for this reason, highly susceptible to noise which may be generated by stray electrical or magnetic fields. By placing the playback amplifier as close to the head as is practicable, this objectionable noise can be reduced, but in those instances where a single head is used, the head must be connected to switching circuits which are generally located some distance away from the head. In addition to this objectionable feature, the switching circuits themselves may generate undesirable noise.

It is, accordingly, an object of the present invention to provide improved transistor signal amplifying circuits for use in signal recording and reproducing systems in which the recording and detection of signal information is performed by a single device.

It is another object of the present invention to provide an improved transistor signal amplifier circuit for magnetic tape recording systems and the like, wherein switching of low signal level circuits is eliminated, thereby to provide reliable, stable, and substantially noise-free operation.

It is a further object of the present invention to provide an improved and simplified transistor amplifier circuit for signal amplification alternatively in either of two directions in a magnetic tape recording system of the type employing a record-playback head.

In accordance with the invention, a single three-electrode transistor which may be of the junction type is used to provide amplification of signals during two separate cycles of operation. Two of the three electrodes of the transistor may be made to have substantially identical characteristics. A symmetrical transistor is exemplary of this type of transistor. In a magnetic tape recording system, the transistor is adapted, in accordance with the invention, to provide signal amplification during both the recording and playback operations. The magnetic tape record-playback head is connected between a first and a second electrode of the transistor. A circuit which alternately serves as the input circuit for the transistor during recording and as an output circuit during the playback cycle is connected between the first electrode and a third electrode of the transistor, the second and third electrodes being substantially identical. To provide effective amplification of signal information during both cycles of operation, a direct current source of energizing potential whose polarity may be reversed is connected with the electrodes of the transistor.

Figure 2:
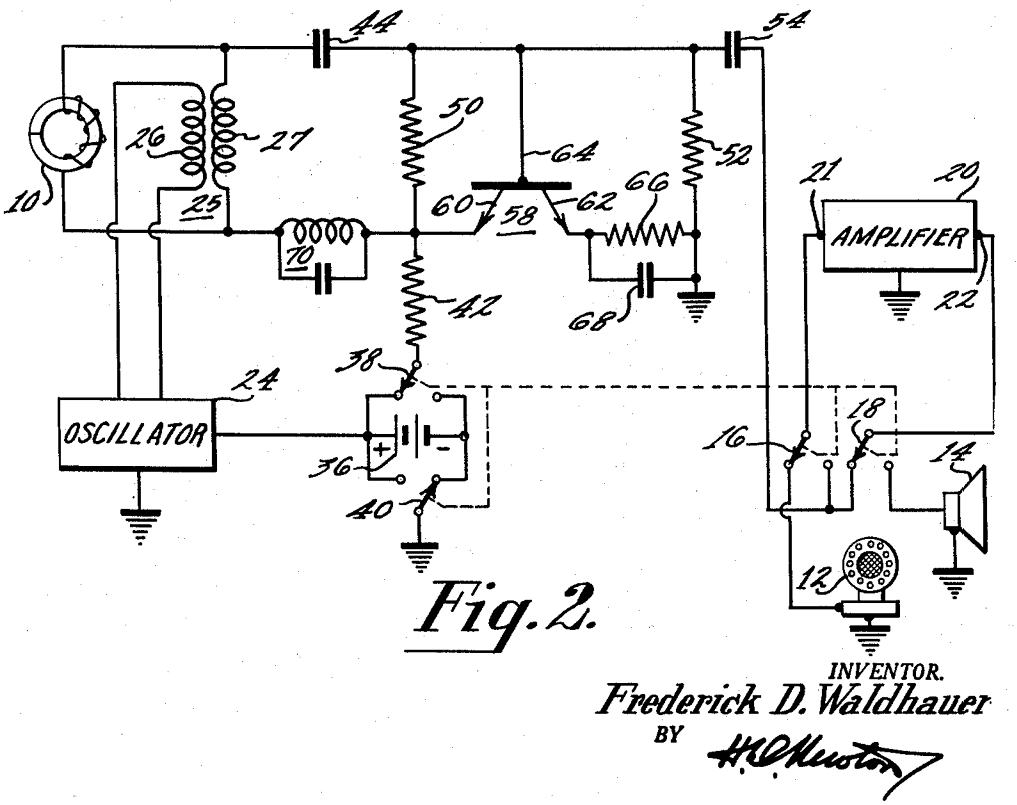

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 1 and 2 are schematic circuit diagrams of magnetic tape recording systems embodying the invention.

Referring now to the drawing, wherein like elements are indicated by like reference numerals in both figures, and referring particularly to Figure 1, a magnetic tape recording system embodying the invention includes a magnetic tape head 10 which serves both as a recording head for recording signals on a magnetic tape and as a playback head for translating stored signal information on the tape into electrical energy. A microphone 12 and a loudspeaker 14 are also provided for the system for use during the record cycle and the playback cycle, respectively. The microphone 12 and the loudspeaker 14 are adapted to be connected in circuit with an amplifier 20, having an input circuit terminal 21 and an output circuit terminal 22, by means of two 2-position switches 16 and 18, which are ganged together for unitary operation as shown. The amplifier and the loudspeaker and microphone have, in the present example, common ground return connections as indicated. To provide a source of high frequency biasing voltage for the magnetic tape head 10 and high frequency power for erasing recorded signals from the magnetic tape during the record operation, an oscillator 24 is provided. The output circuit for the oscillator 24 includes a coupling transformer 25 having a primary winding 26 connected with the oscillator 24 and a secondary winding 27 connected in series with the magnetic head 10.

In accordance with the present invention, a transistor 28, of such properties that amplification of signals alternatively in either of two directions is provided, is used in the magnetic tape recording system. To this end, the transistor 28 is chosen to be of the symmetrical type, that is, it includes two electrodes 30 and 32, in addition to a base electrode 34, the electrodes 30 and 32 being substantially physically identical. Thus, while in the usual case, the electrodes 30 and 32 would be referred to as emitter and collector electrodes, this designation is not appropriate for a symmetrical transistor, since depending on the bias, the electrodes 30 and 32 will interchangeably serve as emitter and collector electrodes. The transistor 28 may be considered to be, for purposes of explanation, of the PNP junction type. Accordingly, the application of negative bias to the electrode 30 will make this electrode act as the collector, the electrode 32 acting as an emitter. If, on the other hand, a positive bias voltage is applied to the electrode 30, it will act as an emitter, the electrode 32 acting as a collector in this case.

To provide a direct current source of energizing potential whose polarity is reversible for the transistor 28, a battery 36 is provided, along with a pair of 2-position switches 38 and 40. The switches 38 and 40 are ganged together for unitary operation with each other and with the switches 16 and 18, and are adjusted to reverse the polarity of the biasing battery 36 relative to the electrodes 30 and 32. The biasing battery 36 is also used to supply operating bias to the high frequency oscillator 24, which may include a transistor as the active element therein. A connection from the positive terminal of the battery 36 to the oscillator is provided for this purpose. In the switch position shown, the positive terminal of the battery 36 is grounded, while the negative terminal of the battery is connected through a resistor 42 to the electrode 30, the resistor 42 serving as a load resistor on the recording portions of the cycle. In this switch position (the one illustrated) the electrode 30 acts as a collector, while the electrode 32 acts as an emitter. This is the switch position for the recording cycle of the system.

One terminal of the magnetic tape head is connected in series with the secondary winding 27 of the biasing transformer 25 and the other terminal is coupled through a coupling capacitor 44 to the base 34 of the transistor 28. To avoid applying a large biasing voltage to the electrodes of the transistor 28 from the high frequency oscillator 24, a shunt bias filter, comprising the series resonant combination of an inductor 46 and a capacitor 48, is connected in parallel with the head 10. The resonant frequency of this combination will normally be that of the oscillator 24. To complete the circuit for the transistor 28, a first resistor 50 is connected between the electrode 30 and the base, while a second resistor 52 is connected between the electrode 32 and the base 34. During the record cycle, the resistor 50 provides operating bias for the transistor 28, while the resistor 52 serves to stabilize the operation of the amplifier. During the playback cycle, the function of the resistors 50 and 52 is reversed. The signal translating circuit for the amplifier is completed by a coupling capacitor 54 which is connected between the base 34 and alternatively selectable switch points of the switches 16 and 18.

In operation, assume that the switches 16, 18, 38, and 40 are in the positions shown. In this switch position, the electrode 30 will act as the collector and the electrode 32 as an emitter as previously explained. Furthermore, the microphone 12 is connected to the input circuit terminal 21 of the amplifier 20, while the output circuit terminal 22 of the amplifier 20 is connected through the coupling capacitor 54 to the base 34 of the transistor amplifier 28. Accordingly, a signal representative of voice or other audio frequency energy picked up by the microphone 12 is amplified by the amplifier 20. This amplified signal is applied between the base 34 and the electrode 32 of the transistor 28, the electrode 32 serving as an emitter. This signal is then further amplified by the transistor 28 and coupled from the electrode 30, which acts as the collector, to the magnetic head 10 which then records this information on the tape as it moves past the head.

In the second or righthand position of the switches 16, 18, 38, and 40, the electrode 30 of the transistor acts as an emitter, while the electrode 32 acts as a collector and the system provides playback of signals picked up by the head from the tape. The loudspeaker 14 meanwhile is connected with the output circuit terminal 22 of the amplifier 20, while the input circuit terminal 21 of the amplifier 20 is coupled through the coupling capacitor 54 to the base 34 of the transistor 28. Accordingly, signals picked up by the head 10 are applied through the coupling capacitor 44 between the electrode 30 and the base 34 of the transistor 28. These signals are amplified by the transistor and derived from between the electrode 32 and the base 34. The amplified output signals are then applied through the coupling capacitor 54 to the input circuit terminal 21 of the amplifier 20, wherein they are amplified and then reproduced by the loudspeaker 14.

An additional advantage of circuits in accordance with the invention is that satisfactory equalization of signals with respect to frequency for the purpose of securing more uniform frequency response may be achieved with great simplicity. Because of the low input impedance of the transistor amplifier during the playback operation, the usually required low frequency equalization, if desirable, may be incorporated in the amplifier 20, and may generally be the same during both playback and recording operations. Thus equalizer switching may be avoided.

In Figure 2, a tape recording and playback system embodying the invention and similar to the system of Figure 1, includes a transistor amplifier device 58 which in this case may be considered to be of the NPN junction type, that is, a transistor of P type conductivity as opposed to the N type transistor used in the circuit illustrated in Figure 1. Like the amplifier of the circuit of Figure 1, the transistor 58 is adapted to amplify signals alternatively in either of two directions. The transistor 58 includes two electrodes 60 and 62 each of which may in turn operate as a collector electrode with application of a reverse bias thereto while the other electrode acts as a forward-biased emitter. The transistor 58 further includes a base electrode 64. Since the transistor 58 is of P type conductivity, the application of a positive voltage to the electrode 60 relative to the electrode 62 will make the electrode 60 act as a collector, while the electrode 62 will act as an emitter. Application of a negative energizing potential to the electrode 60, on the other hand, will cause the electrode 60 to act as an emitter, while the electrode 62 will act as a collector.

Additional stabilization during the recording cycle is provided in the circuit of Figure 2 by the connection of a stabilizing resistor 66 between the electrode 62 and ground. This resistor is by-passed at signal frequencies by a capacitor 68. By inclusion of the resistor 66 in series with the electrode 62, further stabilization of the amplifier, particularly at high output signal operation on the recording cycle, is provided, where a closely controlled operating point is desired. The voltage drop across the resistor 66 tends to stabilize the current in the electrode 60 and applies reverse bias to the electrode 62 during the record cycle. Another difference in the circuit illustrated in Figure 2 is that parallel bias feed is used from the biasing oscillator 24 to the tape head 10. To provide this type of bias, the secondary winding 27 of the bias transistor is connected across the head 10 as shown. When using this type bias, a parallel resonant bias signal trap is used which comprises a parallel resonant circuit 70 connected between the electrode 60 of the transistor 58 and one terminal of the tape head 10. In other respects the circuit illustrated in Figure 2 is substantially identical to the one illustrated in Figure 1.

Considering the operation of this circuit, assume that the switches 16, 18, 38, and 40 are in the position shown in Figure 2. In this switch position the electrode 60 will serve as a collector, while the electrode 62 will act as an emitter. The microphone 12 is connected to the input circuit terminal 21 of the amplifier 20 and the output circuit terminal 22 of the amplifier 20 is conected through the coupling capacitor 54 to the base 64 of the transistor 58. Accordingly, signals from the microphone are amplified by the amplifier 20 and are applied between the base 64 and the electrode 62 of the transistor 58. These signals are then further amplified by the transistor 58 and coupled from the electrode 60 to the magnetic head 10 which then records this signal information on the magnetic tape.

In the second switch position, the electrode 60 of the transistor will act as an emitter, while the electrode 62 will act as a collector. In this switch position, the system will provide playback of signals picked up by the head 10 from the tape. The loudspeaker will be connected with the output terminal 22 of the amplifier 20, while the input terminal 21 of the amplifier 20 is coupled through the coupling capacitor 54 to the base 64 of the transistor 58. Signals picked up by the head 10 will then be amplified by the transistor and an amplified version of these signals will be derived from between the electrode 62 and the base 64. The output signals are then coupled through the coupling capacitor 54 to the input of the amplifier 20, where they are further amplified and then reproduced in the loudspeaker 14.

As described, amplifier circuits embodying the invention are stable in operation and provide signal amplification at low noise levels with a minimum of circuit components. Moreover, these circuits can be used, as shown, in tape recording and reproducing systems without complications heretofore found in the switching circuits. Equalization of signals with respect to frequency is also readily accomplished in circuits embodying the invention. Accordingly, by using amplifier circuits of the type embodying the invention in magnetic tape record-playback systems, these systems acquire the advantages of simplicity, reliability, and stability, as well as small size and low power consumption.

What is claimed is:

1. In a magnetic tape recording and playback system, the combination with a magnetic record-playback head, recording signal input means, and playback signal output means, of a transistor amplifier device having a base electrode and two similar further electrodes, means permanently coupling said head with said base electrode and one of said further electrodes for applying a signal therebetween during the playback cycle of said system and for deriving a signal therefrom during the recording cycle of said system, means for deriving a signal between the second of said further electrodes and said base electrode and for applying the derived signal to said playback signal output means in the playback cycle of said system and for applying a signal from said recording signal input means between the second of said further electrodes and said base electrode in the recording cycle of said system, means providing direct-current biasing potentials for said system, and means for applying said biasing potentials to said electrodes to provide signal amplifying operation through said transistor device from said head to said playback output means in the playback cycle of said system and for reversing the polarity of the biasing potential applied to said electrodes to provide signal amplification through said transisitor device from said recording signal input means to said head in the record cycle of said system.

2. In a magnetic tape recording and playback system, the combination with a magnetic record-playback head, recording signal input means, and playback signal output means, of a symmetrical transistor having a base electrode and a first and a second further electrode, said first and second two further electrodes being substantially identical, signal conveying means permanently coupling said head with said base electrode and said first further electrode for applying a signal therebetween in the playback cycle of said system and for deriving a signal therefrom in the recording cycle of said system, means for deriving a signal between said second further electrode and said base electrode and for applying the derived signal to said playback signal output means during the playback cycle of said system and for applying a signal from said recording signal input means between said second further electrode and said base electrode during the recording cycle of said system, means providing direct-current biasing potentials for said system, a first resistor connected in series between said first further electrode and said base electrode providing operating bias for said transistor during the recording cycle and stabilization for said transistor during the playback cycle, a second resistor connected in series between said second further electrode and said base electrode providing stabilization for said transistor during the recording cycle and operating bias for said transistor during the playback cycle, and means for reversing the polarity of said biasing potentials relative to said further electrodes of said transistor to provide signal amplification through said transistor from said head to said playback output means for the playback cycle of said system and signal amplification through said transistor from said recording signal input means to said head for the recording cycle of said system.

3. In a magnetic tape recording and playback system, the combination with a magnetic record-playback head, recording signal input means, and playback signal output means, of a transistor having a base electrode and two further substantially identical electrodes whereby said transistor is symmetrical for signal translation in two directions, signal conveying means permanently coupling said head with said base electrode and one of said further electrodes for applying signals therebetween in the playback cycle of said system and for deriving signals therefrom in the recording cycle of said system, first switching means connected with said recording signal input and playback signal output means for applying signals derived from said transistor to said playback output means in the playback cycle of said system and for applying signals from said recording signal input means between the second of said further electrodes and said base electrode in the recording cycle of said system, means providing direct current biasing potential for said system, and second switching means connected with said bias potential means and said further electrodes for reversing the polarity of said potential relative to said further electrodes to provide signal amplification through said transistor selectively in either of said two directions.

4. In an electrical signal translating system having two separate cycles of operation, the combination with signal detection and recording transducer means, of a transistor of the symmetrical type having a base electrode and first and second similar electrodes, signal conveying means permanently coupling said transducer means with said base and first electrodes for applying a signal therebetween during a first cycle of operation of said system and for deriving a signal therefrom during a second cycle of operation of said system, means for applying a signal between said second and base electrodes during said second cycle of operation of said system and for deriving a signal therefrom during said first cycle of operation, means providing direct-current energizing voltage for said system, and means for applying said voltage to said first and second electrodes of said transistor in a polarity to provide signal amplification through said transistor in one direction during said first cycle of operation and for reversing the polarity of the voltage applied to said first and second electrodes to provide signal amplification through said transistor in an opposite direction during said second cycle of operation.

5. In a tape recorder system, the combination with unitary transducer means for alternative conversion of magnetic and electrical signals to and from a tape or the like, of a reversible transistor amplifier for said transducer means including a transistor device having a base electrode and two similar electrodes, circuit means permanently connecting said transducer means between said base electrode and one of said two similar electrodes, means connected with said two similar electrodes providing energizing voltage therefor of reversible polarity to determine the direction of signal translation through said device, and means coupled to said base electrode and the other of said similar electrodes for selectively applying thereto and deriving therefrom signals for translation through said system to and from said transducer means in accordance with the polarity of said similar electrodes.

6. In a tape recorder system, the combination as defined in claim 5, wherein the means for selectively applying and deriving signals includes a microphone device, a loudspeaker, and selector switch means therefor operable jointly with polarity reversal of said energizing voltage.

7. In a signal translating system for bidirectional operation, the combination with terminal signal transducer means therefor, of means including a transistor having a base electrode and first and second similar electrodes for bidirectional signal amplification, a first resistor connected between said first electrode and said base electrode providing stabilization for said transistor for one direction of operation of said system and operating bias for said transistor for the other direction of operation, a second resistor connected between said second electrode and said base electrode providing operating bias for said transistor for said other direction of operation and stabilization for said transistor for the said one direction of operation, means permanently coupling said transducer means with said base and first electrodes for applying signals thereto for the said one direction of operation and for deriving signals therefrom for the said other direction of operation, means for applying signals between said second and base electrodes for said other direction of operation and for deriving signals from said second and base electrodes for said one direction of operation, means providing direct-current supply of energizing voltage for said system, and means for reversing the polarity of said voltage supply means relative to said first and second electrodes of said transistor to provide bidirectional signal amplification in said system through said transistor.

8. In a magnetic tape recording and playback system, the combination comprising, a magnetic record-playback head, a microphone, a loudspeaker, a symmetrical junction transistor having a base electrode and two further substantially identical electrodes, signal conveying means permanently coupling said head with said base electrode and one of said further electrodes for applying a signal from said head between said base and one of said further electrodes during the playback cycle of said system and for deriving a signal from said base and said one electrode during the recording cycle of said system, means for deriving a signal between the second of said further electrodes and said base electrode and for applying the derived signal to said loudspeaker during the playback cycle of said system and for applying a signal from said microphone between the second of said further electrodes and base electrodes during the recording cycle of said system, and means connected with said further electrodes for biasing and reversing the polarity thereof to provide signal amplification through said transistor from said head to said loudspeaker during the playback cycle of said system and signal amplification through said transistor from said microphone to said head during the record cycle of said system.

References Cited in the file of this patent

UNITED STATES PATENTS

| | | |
|---|---|---|
| 2,654,003 | Dahiell | Sept. 29, 1953 |
| 2,711,445 | Steinegger | June 21, 1955 |
| 2,717,342 | Pfann | Sept. 6, 1955 |
| 2,763,832 | Shockley | Sept. 18, 1956 |

OTHER REFERENCES

Transistor Electronics by Lo, Endres et al., published by Prentice-Hall, Inc., pages 146–152.